(12) United States Patent
Wilkes

(10) Patent No.: US 7,690,151 B2
(45) Date of Patent: Apr. 6, 2010

(54) MOISTURE ABSORBING AND WATER TRANSFERRING SELF WATERING STRUCTURED STACKABLE PLANT CONTAINERS

(76) Inventor: Nancy J. Wilkes, 1298 Stephenridge Ct., St. Charles, MO (US) 63304

( * ) Notice: Subject to any disclaimer, the term of this patent is extended or adjusted under 35 U.S.C. 154(b) by 1054 days.

(21) Appl. No.: 11/348,639

(22) Filed: Feb. 7, 2006

(65) Prior Publication Data
US 2007/0180766 A1 Aug. 9, 2007

(51) Int. Cl.
*A01G 25/00* (2006.01)
(52) U.S. Cl. .......................................................... 47/82
(58) Field of Classification Search ..................... 47/80, 47/82, 83
See application file for complete search history.

(56) References Cited

U.S. PATENT DOCUMENTS

| | | | |
|---|---|---|---|
| 129,451 A | 7/1872 | Baldwin | |
| 2,055,844 A | 9/1936 | Kneller | |
| 2,810,235 A | 10/1957 | Magid | |
| 3,076,290 A | 2/1963 | Gallo | |
| 3,452,475 A | 7/1969 | Johnson | |
| 3,686,791 A | 8/1972 | Mills | |
| D243,031 S | 1/1977 | Anderson | |
| 4,102,081 A | 7/1978 | Morrow | |
| 4,117,632 A | 10/1978 | Pearce | |
| 4,236,351 A | 12/1980 | Smith | |
| 4,346,532 A | 8/1982 | Peterson | |
| 4,614,056 A | 9/1986 | Farkas | |
| 4,779,378 A | 10/1988 | Mason | |
| D306,985 S | 4/1990 | Mason, Jr. | |
| D309,878 S | 8/1990 | Mason, Jr. | |
| 5,136,806 A | 8/1992 | Kang | |
| 5,155,934 A * | 10/1992 | Leider | 47/86 |
| 5,644,868 A | 7/1997 | Lui | |
| D382,512 S | 8/1997 | Hulsebus | |
| 5,819,469 A | 10/1998 | Hsu | |
| 6,128,853 A | 10/2000 | Klonel et al. | |
| 6,321,487 B1 * | 11/2001 | Sardanelli et al. | 47/81 |
| 6,357,179 B1 | 3/2002 | Buss | |
| 6,520,366 B1 | 2/2003 | Bradley et al. | |
| 6,612,073 B1 | 9/2003 | Powell et al. | |

(Continued)

FOREIGN PATENT DOCUMENTS

AU 634522 2/1993

(Continued)

*Primary Examiner*—Francis T Palo
(74) *Attorney, Agent, or Firm*—Paul M. Denk

(57) ABSTRACT

A moisture absorbing and water transferring self watering structured planters, including a plurality of a tapering plant pots, capable of mounting one upon another in a staggered fashion, to provide a series of stacked planters, a bottom planter shaped to provide for its accommodations upon a deck rail, or the bottom planter may locate within a tray, even one that contains casters, to provide freedom for movement upon a patio, deck, or other floor. Contained within each of the stackable containers, and also within the bottom planter, is an elevated base, containing perforations, and a series of downwardly depending slotted wells, the latter into which potting soil may locate, for submerging into any water contained within water reservoirs provided within the bottom of each container, or bottom planter, to achieve migration of water upwardly into the potting soil, for irrigation and moisturization of the root system of any planted vegetation.

7 Claims, 9 Drawing Sheets

U.S. PATENT DOCUMENTS

| | | | |
|---|---|---|---|
| D493,384 S | 7/2004 | Jensen | |
| 6,840,008 B1 | 1/2005 | Bullock | |
| D505,881 S | 6/2005 | Merayo et al. | |
| 2001/0052199 A1 | 12/2001 | Klein | |
| 2007/0180766 A1* | 8/2007 | Wilkes | 47/83 |
| 2007/0186469 A1* | 8/2007 | Keats | 47/83 |

FOREIGN PATENT DOCUMENTS

| | | |
|---|---|---|
| DE | 2704414 | 9/1978 |
| DE | 3618833 | 12/1987 |
| EP | 0142471 | 5/1985 |
| FR | 2715269 | 7/1995 |
| GB | 2230413 A * | 10/1990 |
| GB | 2369980 | 6/2002 |
| WO | PCT/AU98/00432 | 6/1998 |
| WO | WO98/56233 | 12/1998 |
| WO | WO 2005015976 A1 * | 2/2005 |

* cited by examiner

MOISTURE ABSORBING AND WATER TRANSFERRING SELF WATERING STRUCTURED STACKABLE PLANT CONTAINERS

FIELD OF THE INVENTION

This invention relates generally to containers for the planting of flowers or potted vegetation, and more specifically pertains to a series of such pots which are stackable one upon the other, or in a plurality of parallel and adjacent erected positions, with each container incorporating a space for holding a quantity of planting soil, and having a water reservoir therebelow, with a segment of the soil continuously being exposed within the water reservoir to provide for moisture absorption and transferring upwardly into the potting soil, to sustain the watering of the implanted plants, over a substantial period of time.

BACKGROUND OF THE INVENTION

Varieties of plant containers, and other types of containers for holding planted flowers, herbs, vegetation, and the like, have long been available in the art. Some of these pots are more than just for use for planting purposes, but also incorporate means for providing the absorption of moisture into the potting soil, in order to sustain a continuous moisture watering and growth of the supported plant, throughout its vegetative life cycle. In addition, certain of said plant pots have been of the stackable type, where the pots can be stacked one upon the other, in a staggered fashion, and thereby still allow for the plants to grow within the pots at each level of implantation, and at the same time, allow for water to cascade down between the stacked pots, to assure that moisture is provided at each pot level, to sustain such continuous growth.

Various types of stackable pots have been available in the art. For example, the International patent application No. PCT/AU98/00432, discloses a plant pot, which, in use, is adapted to be stacked with one or more similar plant pots. The shape, appearance, and ornamentation of the plant pot shown therein, and its stackability feature, has been commercially marketed in the United States and throughout the world since 1996. It shows a plant pot which includes an upper rim made of lobe sections and bridge sections, a base portion, and a surrounding wall, extending between the upper rim and the base portion, shaped as so to define a plurality of radially extending lobe sections. The base portion includes a recess, formed in the underside of each lobe section. The upper edge and recesses are configured in such a way that when two or more plant pots are stacked, the rim and the recesses of a plant pot, and its subjacent pot, inter-engage and can be positioned together to hold the pots firmly in place. Thus, that shaped pot, as shown therein, has been available for many years in the art.

Other types of stackable plant pots, in addition to plant pots that furnish self watering features, have also long been available in the art. Such can be seen in the published application WO1998/056233, to Keats, which shows stackable plant pots. In addition, the U.S. Pat. No. 3,452,475, to Johnson, shows related structure. In addition, the United States published application to Klein, US2001/0052199, in addition to the U.S. Pat. No. 4,012,081, to Morrow, show related type of structures. Certain foreign applications likewise show similar type structures. Such can be seen in the German patent No. 2704414, to Albrecht. The French patent to Marque, No. 2715269, shows related structure. The British patent to Stone, No. 2369980, shows stackable plant pots. The German patent to Henke, No. 3618833, in addition to the European patent No. 0142471, to Gerber, shows similar structure.

Earlier United States patents shows variations upon plant pots, some which may be stackable, and others which may include self watering features. Such can be seen in the U.S. Pat. No. 129,451, to Baldwin, which shows an improvement in flower pots. This particular pot shows a false floor, in the configuration of a fan-shaped disc, with crown like projection, and which extends up into the potting soil, such that when water is introduced into its lower chamber, moisturization can take place to keep the potting soil moist.

The patent to Kneller, U.S. Pat. No. 2,055,844 shows another self watering flower vessel. It also includes a false floor or bottom, for separating the water area in the bottom, from the soil arranged upwardly in the pot.

The patent to Magid, U.S. Pat. No. 2,810,235, shows a flowerpot and jacket for the same. This also includes a pot, that sits upon a plate, where the water flows into the bottom of an outside container, and also uses a wick that extends upwardly into the soil to provide for wicking thereat.

The patent to Gallo, U.S. Pat. No. 3,076,290, shows a series of stackable flower pots.

The patent to Mills, U.S. Pat. No. 3,686,791, shows walls, screens, and the like, formed as stackable members, for use as multiple flower pots. This particular patent also shows father fluted like pots that can be stacked, staggered, one upon the other, so that its various flutes are exposed for the growth of vegetation thereat.

The patent to Anderson, U.S. Pat. No. Des. 243,031, shows a design for a stackable flower pot.

The patent to Pearce, U.S. Pat. No. 4,117,632, shows another plant watering pot, wherein a lower dish or pan holds a quantity of water, and a series of wicks provide for absorbing moisture up into the potting soil.

The patent to Smith, U.S. Pat. No. 4,236,351, shows another planter with tubular air hole members. This particular receptacle has a dividing wall between a lower compartment, which drains excess water, and the soil as provided thereabove. The various tubes shown therein are designed to evaporate excess water, through the tubes, and keep the soil moist.

The patent to Peterson, U.S. Pat. No. 4,346,532, shows another style of planter.

The patent to Farkas, U.S. Pat. No. 4,614,056, shows various stacking planters. This device is formed of dual planting pots, stacked one upon the other, with a bottom tray.

The patent to Mason, U.S. Pat. No. 4,779,378, shows an integradable, modular stackable multi-plant holder. Once again, this is a stackable type of three plant receiving receptacles on each level, and which receptacles can be stacked, one upon the other, as can noted.

The patent to Mason, Jr, U.S. Pat. No. Des. 306,985, shows a design for a plant container unit.

Another patent to Mason, Jr., U.S. Pat. No. Des. 309,878, is a further design upon the shown plant container. This particular design has the appearance of various flutes, and apparently allows for growth of vegetation upwardly out of said flutes, during usage.

The patent to Kang, U.S. Pat. No. 5,136,806, shows a flower pot and water supplying member for the flower pot. This device has a false bottom, with water collecting therebelow, and potting soil arranged thereabove, with a moisture absorbing material extending from the lower water reservoir up into the soil.

The plant container water water-keeping assembly of Lui, as shown in U.S. Pat. No. 5,644,868, shows a plant pot with a false bottom, and a series of water or ventilating tubes, as can be noted.

The patent to Hulsebus, U.S. Pat. No. Des. 382,512, shows a design for another planter. It appears that it may include a false bottom, with perforations therethorugh, and a center well that apparently is for reception of soil.

The patent to Hsu, U.S. Pat. No. 5,819,469, shows a support plate for flower pots that prevents overflow and inhibits mosquito propagation. This is apparently a support for flower pots, which does include wheels or rollers to provide for its motivation.

The patent to Klonel, U.S. Pat. No. 6,128,853, et al, shows a ball wheeled planter and method.

The patent to Buss, U.S. Pat. No. 6,357,179, shows another self watering planter, where apparently soil extends down into the lower portion of the planter, as can be seen.

The patent to Bradley, U.S. Pat. No. 6,520,366, discloses a beverage container holder.

The patent to Powell, U.S. Pat. No. 6,612,073, et al, shows an intensive plant growing stacking container system. This device also shows a fluted plant pot, where apparently plants can be grown in the radially extending flutes, and the pots apparently can be stacked one upon the other, and also nested, as can be noted.

The design patent to Jensen, U.S. Pat. No. Des. 493,384, shows another stackable planter, with three planters being stacked one upon the other, and a tray provided underneath of the composite.

The patent to Bullock, U.S. Pat. No. 6,840,008, shows a vertical planting system.

The patent to Merayo, U.S. Pat. No. Des. 505,881, shows the design for a rolling plant and tree container.

The Australian patent No. 634522, to Grow-Max Systems, Inc., shows another arrangement for growing plants. This arrangement shows a series of stacked pots, one upon the other, for growing a multiplicity of plants, from at least three containers, and which allows for drain means between the various stacked containers to allow excess fluids to drain into the container located immediately therebelow.

Other patents show plant containers, of the individual type, such as in U.S. Pat. No. 4,102,081, to Morrow, which shows a plate above the bottom of the container for allowing excess water to pass therethrough, to avoid over saturation of the soil, and which is available for moisturization purposes.

The U.S. Pat. No. 3,452,475, shows another self-irrigated planter.

These are examples of a variety of published applications, patents, and the like, throughout the world, that show related technology.

SUMMARY OF THE INVENTION

This invention relates principally to variations added to the structure of stacking plant containers, which can be stacked one upon the other, have self moisturizing features constructed into its base portions, so that the potting soil within each plant pot remains reasonably moist, over extended periods of time, even though watering may not occur for lengthy periods.

The contents of the components of this invention, and their assembly for usage, can generally be summarized as follows:

a) the moisture absorbing and transferring self watering structured plant containers of this invention include a series of vertically stackable planters, two or more in number, that may be stacked vertically, in usage;

b) the vertical stackable planters can be applied to a lower planter or tray planter, that may mount directly onto or be pressure fitted upon the rail of a deck railing, porch railing, or like, to provide an assembly of planters that may be used and displayed in that manner;

c) the structured plant pots and planters of this invention may likewise be used in conjunction with a lower tray, which may be either stationarly located for reception of the variety of the planters, and planters stacked thereon, or the tray may include a series of casters, to make it a wheeled structured, to facilitates its movement and shifting, rather easily, when desired to provide for its relocation; and d) all of the above assembly of trays, lower planters, planting containers, stackable pots, and the like, will include a slotted or perforated elevated base, that fits respectively into any one of the variety of containers previously referred to, and each base including one or more downwardly depending integral wells, into which moisture absorbing and wicking potting soil may be contained, for use for the migration of moisture upwardly into each planter, through its potting soil, for the watering of the root systems of any of a variety of plants or vegetations provided therein. This invention contemplates the formation of stacking pots, of the type of containers that are used to plant flowers, and other vegetation, and where the pots may be used individually, or in combination, stacked one upon the other, in order to assure constant moisturization of the potting soil holding the variety of vegetation, at the various levels, during usage. Each pot has a multi-shaped configuration, from an opened upper lip that extend around its entire periphery, and each pot tapers downwardly, into a base portion, where it pressure grips onto the lip of the subjacent planter, in order to reasonably hold the stacked containers together, during usage. There is a bottom tray that is applied underneath all of the stacked pots, and the tray may either be for mounting thereabove an individual vertical column of stacked pots, or the tray may be elongated, and hold erected rows of stacking pots thereon, so that the stacked pots may be erected upwardly, in two or more vertical columns, during their usage.

The trays provided underneath of the stacked pots, and regardless whether they be stacked in a singular or double column, are designed for either having rollers or castors provided thereon, upon their underside, in order to facilitate the movement of the stacked containers around the floor, patio, and the like. Furthermore, select of the trays are designed to accommodate their mounting onto a railing of a porch, or deck, so that the planters may be utilized even at that location, to enhance the beauty of the residence or building, during their application and usage.

One of the primary features of this invention comprises the usage of a uniquely shaped elevated base, one that sits within the approximate bottom of a container, and which includes an aperture therethrough, so that it may be positioned, centrally, within the pot, during usage. The elevated base has a series of opening provided therethrough, and which allows for water and other moisture, excessively, to pass therethrough, and into the bottom of each container, for retention therein, and which moisture is available for further wetting of the potting soil, arranged upwardly thereof, within the pot, to sustain the life of any plants, and to assure that adequate moisture is provided thereto, over an extended period of time. Each elevated base has a unique shape formed having one or more integral wells provided therein, and extending downwardly into the central water reservoir, so that the potting soil that is arranged above the elevated base, and which extends down into each well, that soil within the well will be continuously exposed to the water, to provide for the absorption and migration of moisture upwardly, to sustain the wetting of the potting soil, during usage. Each elevated base extends outwardly to the inner proximate surface of the flutes formed of each planter, and the purpose for this is to sustain the potting soil thereabove, but yet allow and provide sufficient clearance for excessive water to enter downwardly into each pot, preferably at the central location where the water reservoir collects the water for further moisturization of the potting soil, but that the water at the outer edge of the elevated base, when it bypasses that portion of the base, and enters downwardly into the bottom of the pot, such accumulated water is allowed to drain from the planting pot into one or more planters arranged and stacked therebelow, in order to provide for multiple planter watering, whenever moisture is added to the upper planters, during usage. Furthermore, the contiguousness of the elevated base in proximity with the inner surfaces of the lower planter, internally thereof, further prevents the creation of flow paths, which under certain circumstances could allow for insects, such as mosquitoes, from entering into the central water reservoir, and forming a breeding ground thereat. Hence, the technical design of the elevated base as structured into the formed planters of this invention have attributes far beyond just functioning as flower pots, and not only furnish means for maintaining the critical moisturization of the potting soil within each planter, to channel excess water into the central reservoir region, which extends soil wells into the water, so as to constantly moisturize and wick water upwardly into the potting soil, while at the same time, acting as a hindrance against providing a breeding ground for insects, during usage. Furthermore, the main supporting trays for the stacked pots can either be applied and held onto a railing, one of standard size, or the wheeled structure for the modified tray allows for the easy transfer of all of the stacked pots, which may collectively have significant weight, to other locations, as desired.

It may also be commented that wicks, such as made of fabric, cotton, paperboard, or any other wicking material, may be used for extension through the elevated base of each planter, for assisting in migration of water contained within a container's reservoir to migrate upwardly into the potting soil, to further aid in the retention of its moisturization, and preservation of any plant life that is planted therein.

It is, therefore, the principle object of this invention to provide a series of stacking planter containers, that may be stacked one upon the other, either in single, double, or more vertical columns, applied to a tray, with each planter having an elevated base provided therein that allows for continuous integral moisturization of the potting soil within each planter, during usage.

Another object of this invention is to provide an elevated base for use within a planter that controls the migration of water and moisture, channels it towards the reservoir, but does not contract the potting soil that allows insects, or the like, to descend therein to the water for breeding purposes.

Another object of this invention is to provide a series of stacking planters, that may be applied and rested upon a floor or deck, or which may embrace a railing, during their usage.

Another object of this invention is to provide a series of stackable planters, that are self watering.

A further object of this invention is to provide a series of planters that when water is applied to the top planter, there is natural watering of all the subjacent planters, during usage.

Still another object of this invention is to provide a planter pot that functions to bring moisture up to the plants, through the potting soil, from a water reservoir maintained therebelow.

Still another object of this invention is to provide planters that allow for excess water to drip down to the planters provided therebelow.

These and other objects may become more apparent to those skilled in the art upon review of the invention as summarized herein, and as explained in the description of the preferred embodiment, in view of the drawings.

BRIEF DESCRIPTION OF THE DRAWINGS

In referring to the drawings, FIG. 1 provides an isometric view of a series of three vertically stacked planters stacked upon an underlying tray.

DESCRIPTION OF THE PREFERRED EMBODIMENT

Figure 1:
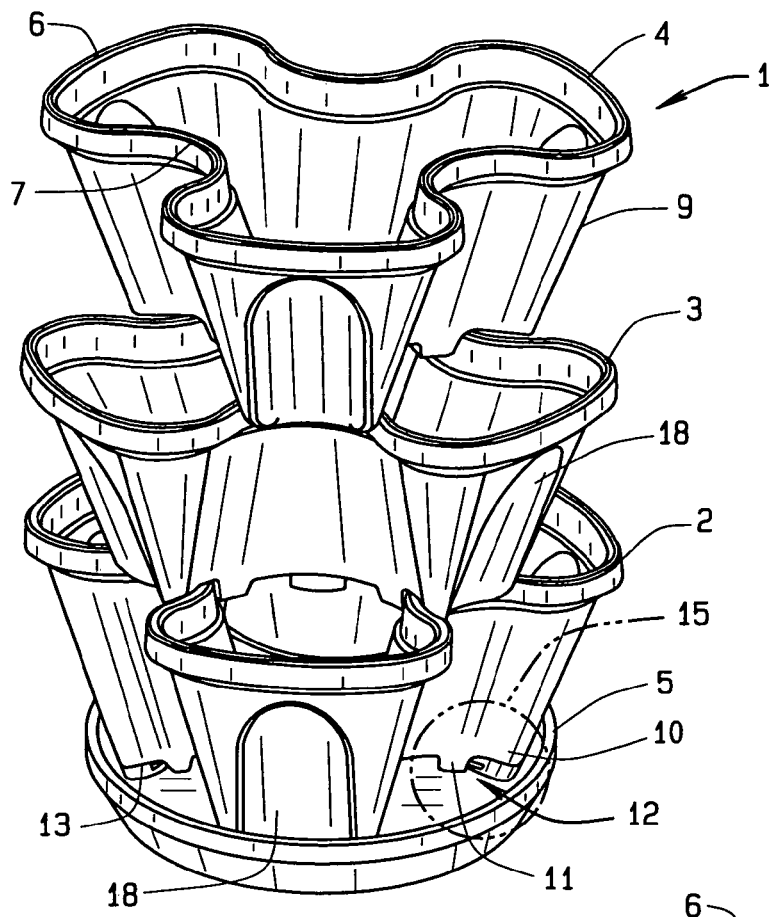

In referring to the drawings, in particular FIG. 1, the basic assembly of the stacking containers 1 of this invention is readily disclosed. In this instance, it shows three containers, 2, 3 and 4, stacked one upon another, in staggered fashion, with all the pots being assembled for resting upon the lower tray 5, as can be seen. More or less than three containers may be used. The stacked containers are more aptly disclosed in a top plan view in FIG. 2. As can be seen, each container 4 is arranged approximately forty-five degrees from the location of the container 3, so that the fluted sections of a pot will be arranged in alignment with the inturned portion of each pot, as can be noted. For example, the fluted or extended portions of each container can be seen at 6, while the inturned portions can be noted at 7. Hence, as noted, the flutes of container 3 are aligned with the inturned portions 7 of the container arranged thereabove.

It should be noted that the shape and configuration for these containers has been available, publicly, since the mid-1990's, for use for stack potting purposes.

Each of the containers has its shown reinforced upper lip, as at 8, and each container then tapers downwardly, along the walls 9, to a narrowing dimension. At the bottom of each container is a downwardly extending segment, as at 10, and inwardly, integrally formed therewith, is a depending extension 11. Thus, the space intermediate the downward extension 10, and the dependent portion 11, as can be noted at 12, provides a clearance slot for use for embracing the upper rim 8 of the container arranged therebelow, to provide for a snug fit therein, and even some frictional connecting, to assure the stacked containers are held together, when assembled in the manner as showing in FIG. 1. In addition, the downward extension 10 forms a well internally of the flute 6 for each planter, and each includes a series of slots, one for providing drainage downwardly from each well, but likewise, to furnish means for locking with the upward extensions 13, provided upon each tray, for assuring that the bottom planter 2 is locked in place with its lower tray 5, when assembled. In addition, the depending portion 11, of each planter, and there being one associated with each of the flutes 6 of each container, and centrally inwardly thereof, forms a water reservoir at the bottom of each planter, so that any water that enters therein, remains centrally of the planter, and functions as a source for moisturization of the soil contained within each planter, in a manner to be subsequently described.

Figure 2:
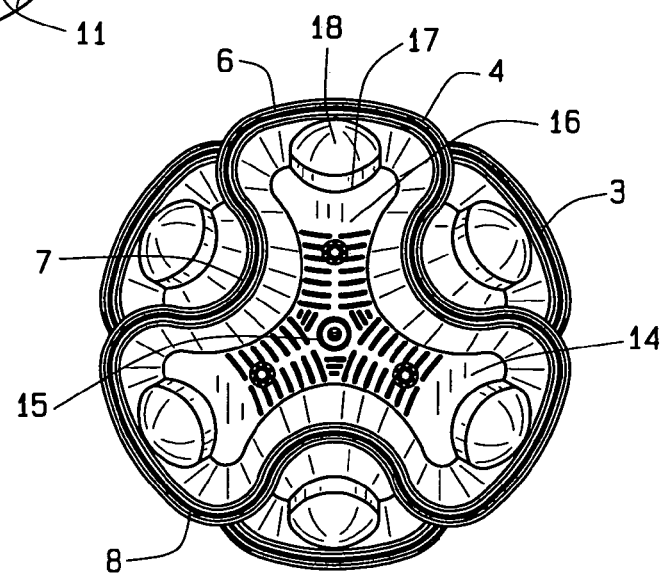
FIG. 2 is a top plan view of FIG. 1.
Figure 6:
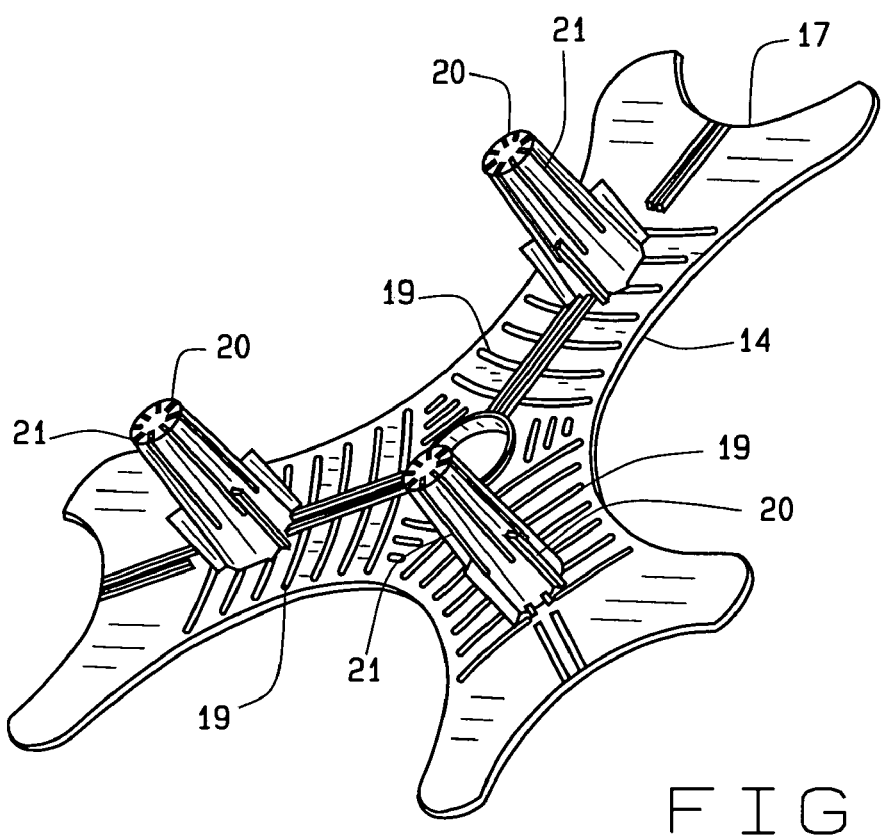
FIG. 6 is an underside perspective view of an elevated base, with integral soil wells, that locates within each planter containers.
Figure 7:
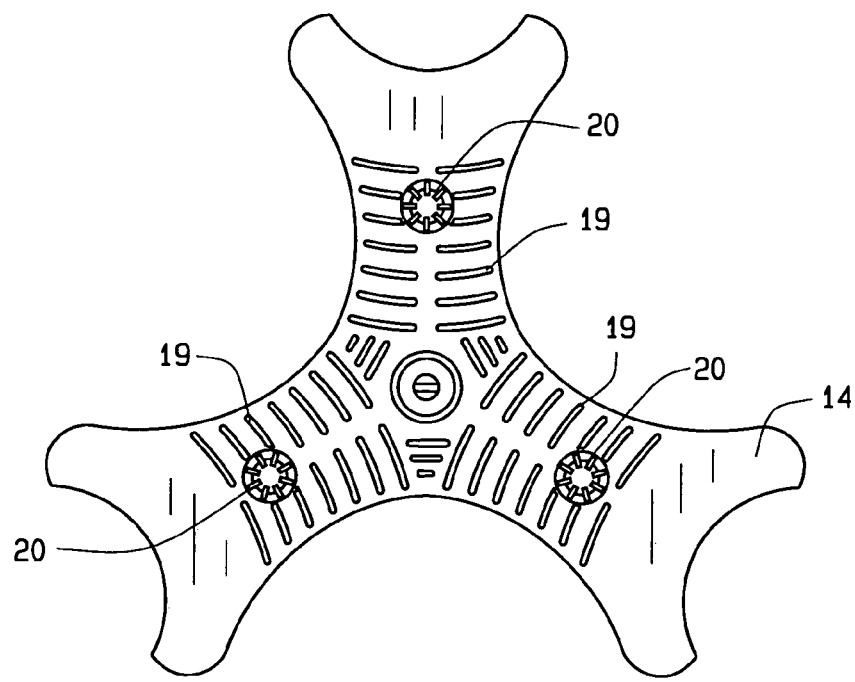
FIG. 7 is a top plan view of the elevated base of FIG. 6.
Figure 8:
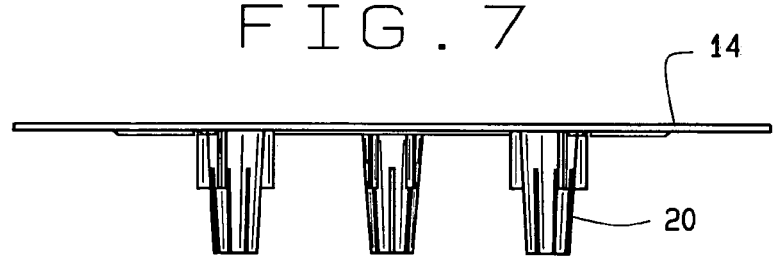
FIG. 8 is a side view thereof.

As can be seen in FIG. 2, there is an elevated base, as at 14, that rest within each planter. The base mounts on to a central cone shaped upward projection 15, and each base has radially extending segments 16, that flare outwardly, as can be seen at 17, for embracing the inwardly grooved areas 18 of each planter, as can be noted. Thus, the elevated base is contiguously arranged internally of each container, and is located in close proximity with the encountered walls of each of the containers, as can be noted. Thus, soil that is placed upon the elevated base, and which fills up the open interior of the container arranged thereabove, cannot shift past the elevated base, and get into the lower water reservoir, thus preventing soil from clogging up the lower water reservoir, and to prevent the stacked planters from performing in a manner of their design. Each of the elevated bases includes a series of slots, as at 19, and such can also be seen in FIGS. 6 and 7. Thus, any excess water that is added into a planter, for irrigating its soil, and which drains to the bottom of the contained soil, will encounter the elevated base 14, and pass therethrough, for collection within the lower water reservoir, as defined.

It should also be noted that the elevated bases includes a series of downwardly extending wells, as at 20, and these wells each include a series of slots, as at 21, so that when soil is added into the planter, for filling its container, it will also fill up each of the wells 20. Hence, since these wells extend downwardly, and down into the water reservoir, any soil contained therein will be exposed to the water within the lower reservoir, which migrates through the slots 21, and thereby sustains wetness of the potting soil at that location. Since potting soil usually has a high moisture retention contend, since it frequently may contain other ingredients in its mixture, such as zeolite, or other moisture absorbing ingredients, such that the moisture absorbed into the potting soil within each well also migrates upwardly into the potting soil contained within the planter, so as to provide further irrigation for the root system of any plant that is planted within the container, during its usage. The bottom of each well 20, extends downwardly into the water reservoir, as is arranged approximate the bottom of the containers, either 2, 3, or 4, in which it is installed.

Figure 9:
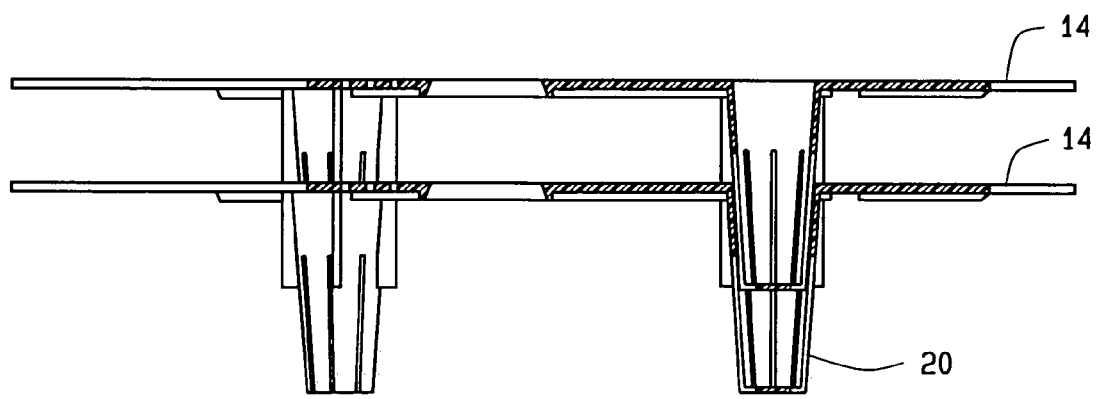
FIG. 9 discloses how the elevated bases may nest one upon another.

As can also be noted in FIG. 9, these elevated bases 14 are capable of nesting, so as to facilitate their storage, transit, and even display as during sale, or usage, in combination with their planters, and their other components for each stacking pot. As can also be understood from reviewing FIG. 1, when the stacking planters, or there containers, are aligned with each other, and are not arranged at a forty-five or sixty degree angle from each other, they likewise are capable of nesting one within the other, so as to facilitate there stacking, nesting, storage, shipment, packaging, and display for sale.

Figure 10:
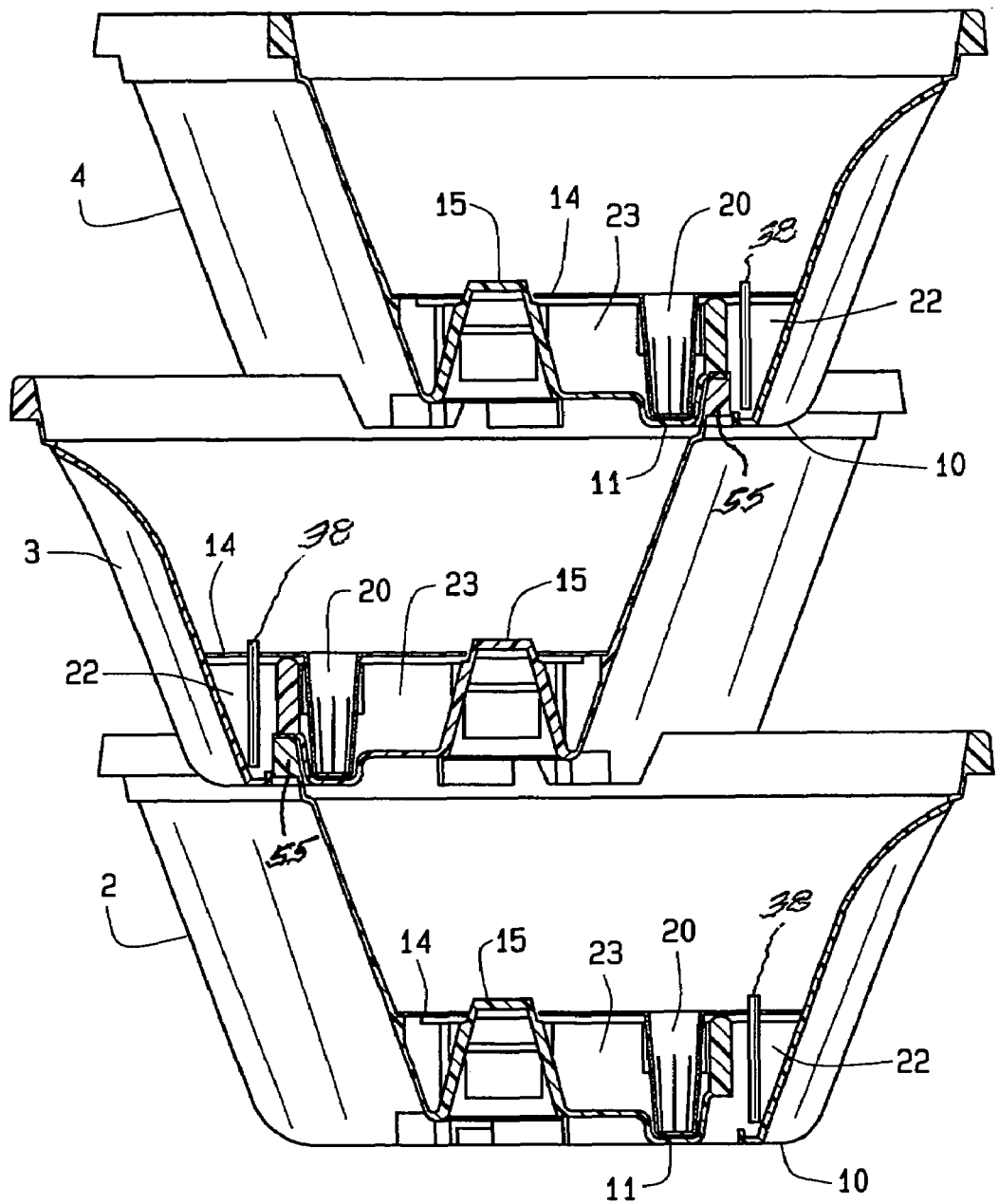
FIG. 10 is a sectional view of three stacked planter containers each showing its elevated base provided therein.

FIG. 10 displays how each of the containers 2, 3, and 4 mount and stack one upon the other. When doing so, it can be seen that the outer water well, as previously described, can be noted at 22. As previously explained, this is formed within the lower extension 10, for each of container. Likewise, the downwardly extension 11 provided for each container, and which forms the outer boundary of the water reservoir 23, forms a lower opening into which a downwardly extending well 20 locates, when the container is properly aligned, and the planters are stacked vertically one upon the other, in their staggered fashion as previously reviewed. The lower and centered cone 15, integrally formed of the bottom of each container, can be noted, and it provides a stable member upon which the elevated base 14, for each container, locates, when it is inserted within its respective container, in preparation for filling of the planter with potting soil, for the eventual planting of plants, or other vegetation. A weir, 55, of FIG. 10, separates the water reservoir 23, from the outer water well, as at 22, as noted.

These are examples of how the various molded components for the containers, and their elevated bases, all cooperate together to provide for a convenient locating of each planter, one upon another, when they are staggered, and assembled, in preparation for their reception of plants.

Figure 3:
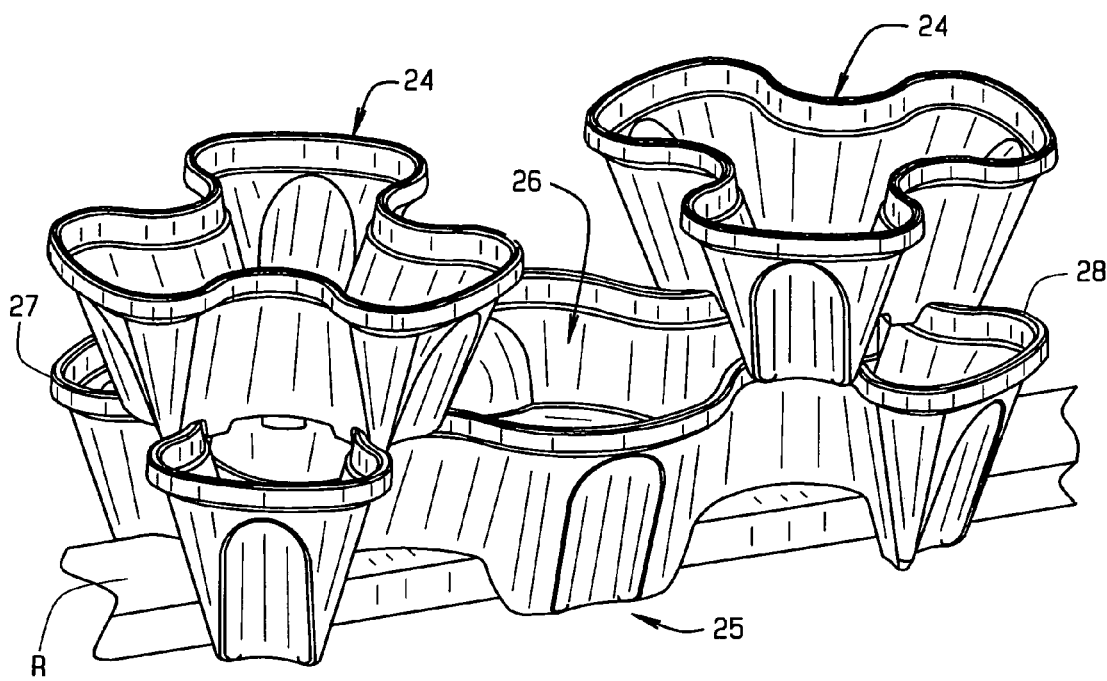
FIG. 3 shows a series of planters mounted onto a railing planter tray.

A variation upon the planter of this invention can be seen in FIG. 3. The containers 24 are the same configuration and design as the containers 2, 3, and 4, as previously described. But, in this instance, a bottom planter 25 has a unique shape of furnishing a central planting area 26, and a pair of integral side planters 27 and 28. As such, and as can be noted, the contours for the upper rim of the lower planter 25 are such that the outer portions are contoured to accept and mount in a mating fashion thereon the planters 24, as noted. Thus, flowers may not only be planted within the upper planters 24, but they may likewise be planted within the outer planter fluted portions 27 and 28, and in addition, vegetation may be planted within the central planter area 26, as can be understood.

Figure 11:
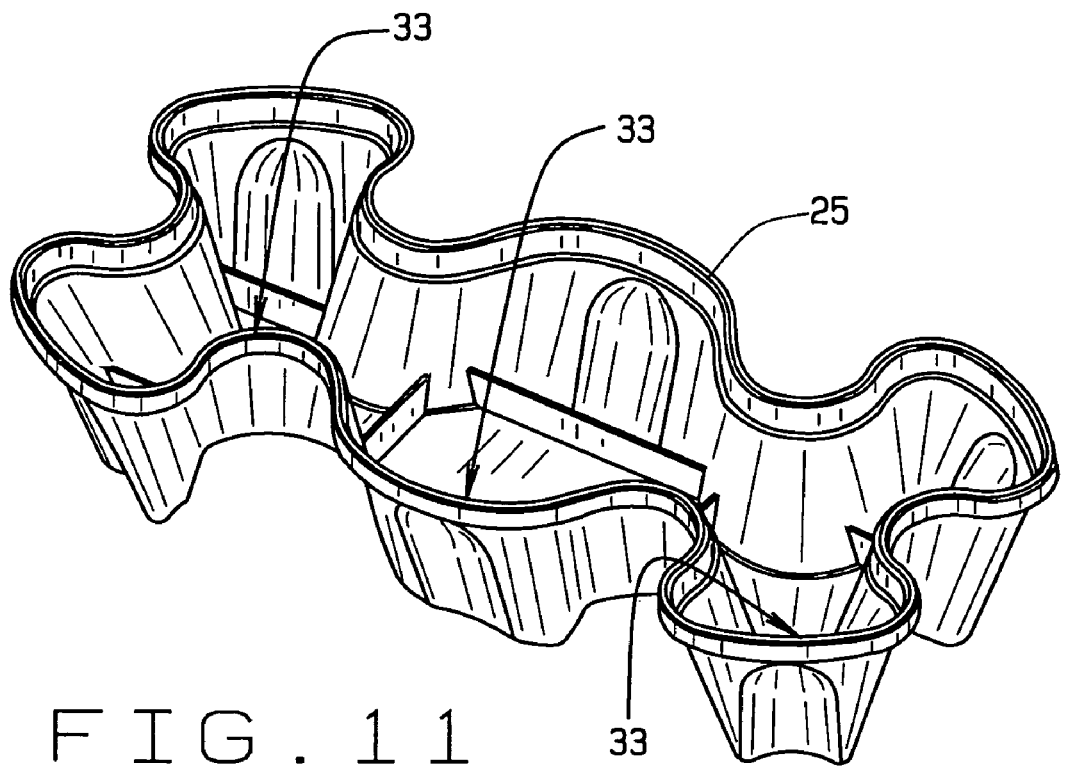
FIG. 11 is an isometric view of the planter base tray as shown in FIGS. 3 and 4.
Figure 12:
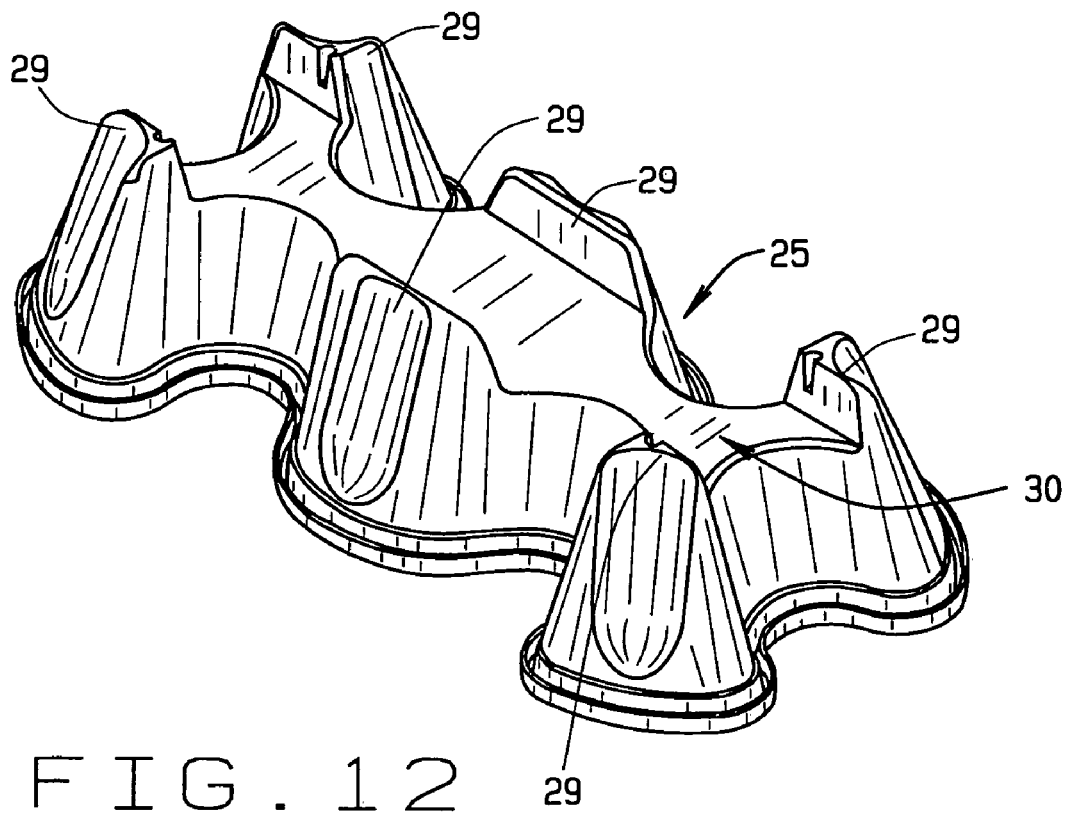
FIG. 12 is an inverted view thereof.
Figure 13:
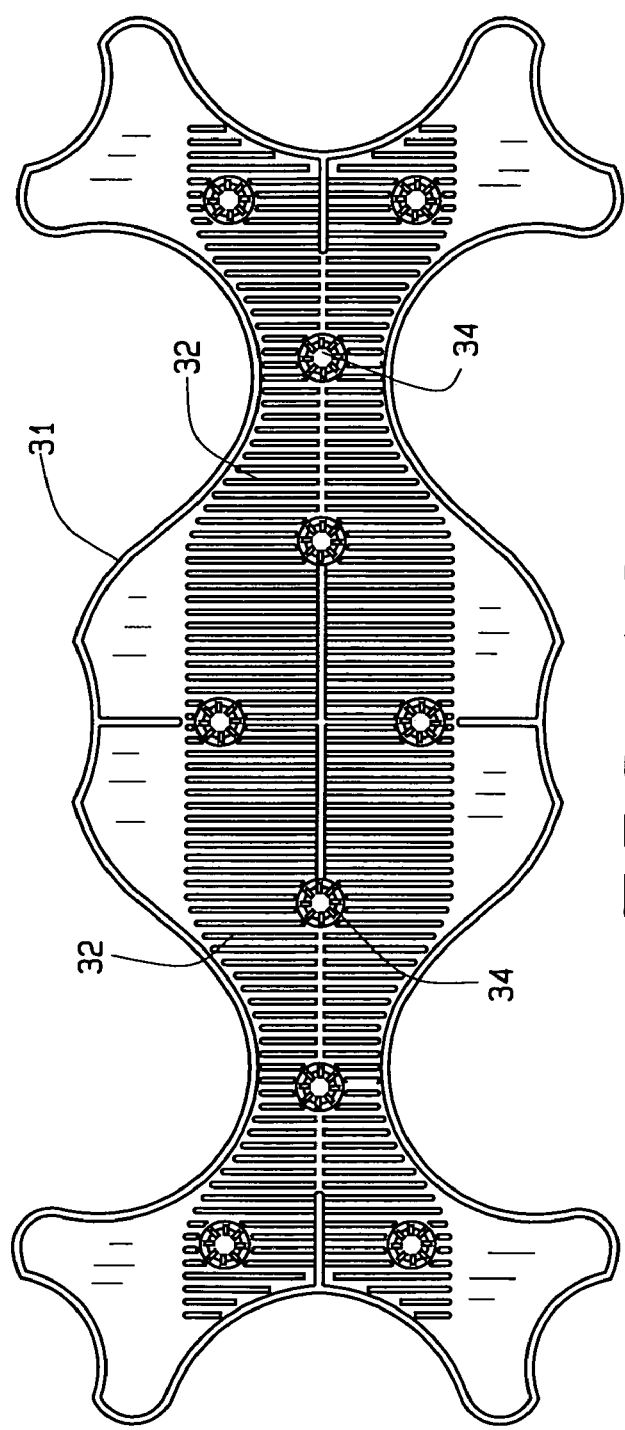
FIG. 13 is a plan view of the sloped elevated base that locates within the planter tray of FIG. 11.
Figure 14:
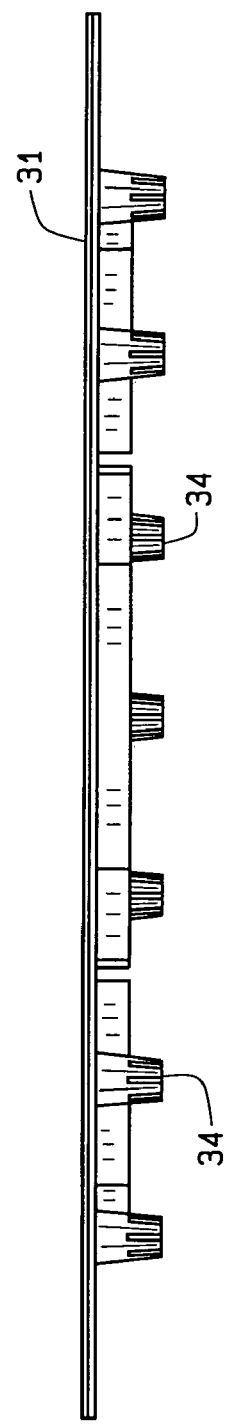
FIG. 14 is a front view of the elevated base of FIG. 13.

The bottom planter 25, for the embodiment as shown in FIG. 3, is also disclosed in FIGS. 11 and 12. As can be seen, it includes a uniquely configured bottom contoured area, which includes spaced apart lower extensions, that may hold moisture, these extensions noted at 29. The spacing, as at 30, provided between these lower extensions is molded precisely to the dimensions that allows for the lower planter, when arranged in its up right position, to mount snuggly upon an upper rails R for a deck railing, as can be understood (see FIG. 3). Thus, the combination of lower planter 25, and one or more containers 24, may be elevated vertically, even stacked one on top of the other in a manner as shown in FIG. 1, and be utilized in that manner, as a complete stacked multiple planter system, but yet be secured upon and snuggly held onto the rail or, in their installation. As noted in FIGS. 13 and 14, an elevated base 31 is uniquely contoured in order to fit snuggly within the interior of the lower planter 25, and this base also includes a series of slots, as at 32, so that excessive moisture may drain into the bottom, as at 33, of said lower planter or tray. In addition, there are a series of integrally formed and downwardly slotted wells 34, as can be noted in FIG. 14, and these wells are designed for holding a quantity of the potting soil, and said wells extend downwardly into the water reservoir 33 provided within the bottom of the lower planter tray 25, so as to absorb moisture therein, and wick the water upwardly, within the potting soil to provide continuous moisturization to the root system of any plants that may be planted within this lower planter 25. In addition, any excess moisture that is generated because of over watering within the containers 24, of FIG. 3, will likewise drain downwardly, into the water reservoir 33 of this lower planter 25, during usage and function to add any moisturization to any plants planted therein.

Figure 4:
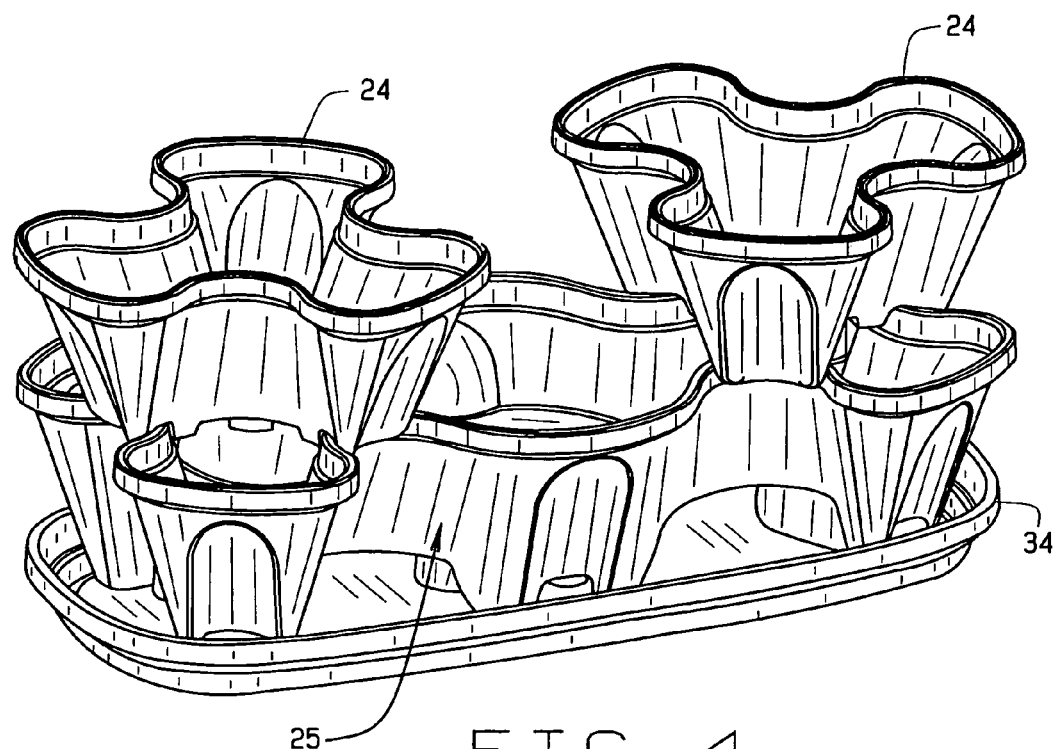
FIG. 4 shows the series of planters and planter base all resting upon an underlying tray.

FIG. 4 shows how the lower planter 25, instead of mounting onto the rail R, may have its own lower tray, as at 34, to hold the lower planter 25 therein, and to allow for stacking of additional containers, as at 24, thereon, during assembly and usage.

Figure 4A:
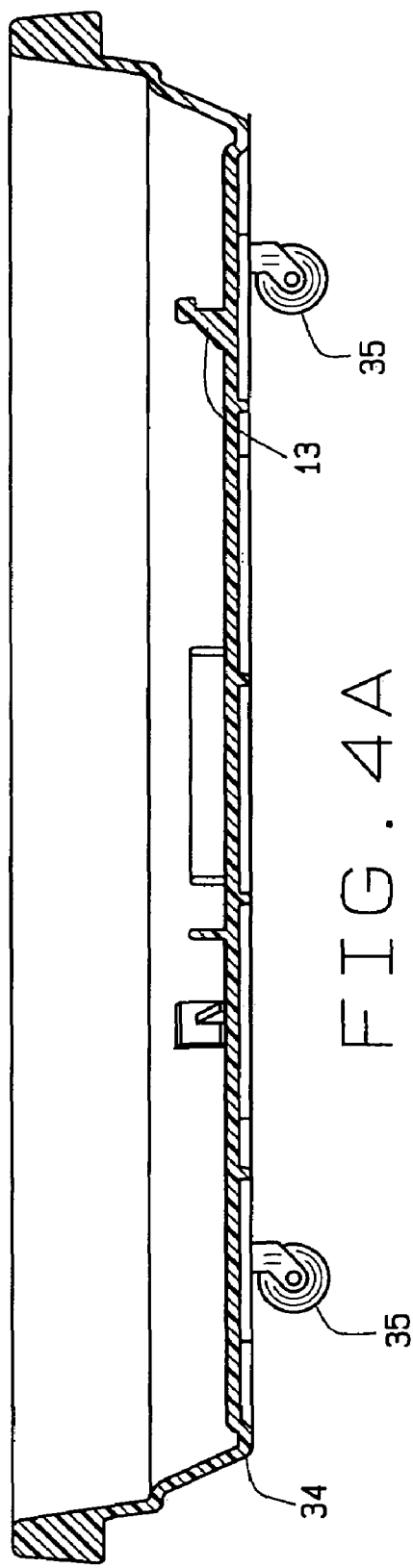
FIG. 4a is a sectional view of a tray, also showing casters to provide and facilitate for its movement.

FIG. 4a shows the configuration of the lower tray 34, and how it may contain a series of caster, as at 35, to allow for the tray and the assembly of its lower planter 25, and additional planters 24, to be moved around a floor, deck, patio, and the like to facilitate it usage and application.

Figure 15:
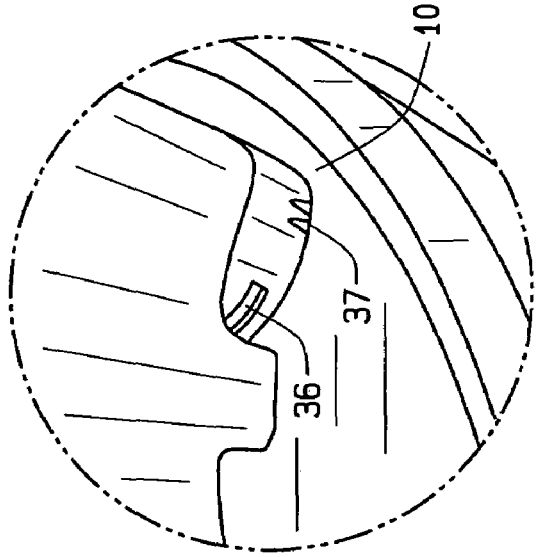
FIG. 15 is a sectional view of part of the outer bottom of a container flute, showing its locking slot for engagement of a planter to its tray.
Figure 5:
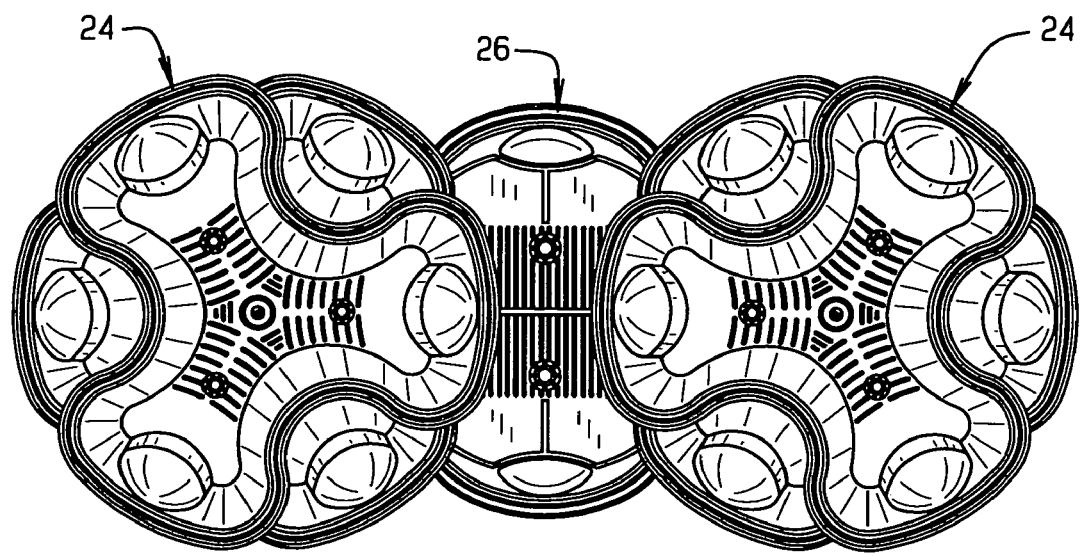
FIG. 5 is a top plan view of the planters and planter base.

FIG. 15 shows the enlarged bottom of the downward extension 10 at the bottom of a flute for one of the containers. It shows the lateral slot 36 into which the locking means 13 engages, for locking a planter in place, within its tray. In addition, there are a series of further slots 37 provided across the bottom of the lower extension 10, so that any water that accumulates therein may drain downwardly, into the next planter therebelow, or into the tray 5, during usage.

It can also be seen in FIG. 10 that various wicks, as previously described, as noted at 38, can be provided through the elevated bases, to aid in the migration of water contained within the containers reservoir upwardly into the potting soil, to add further moisturization therein.

Figure 16:
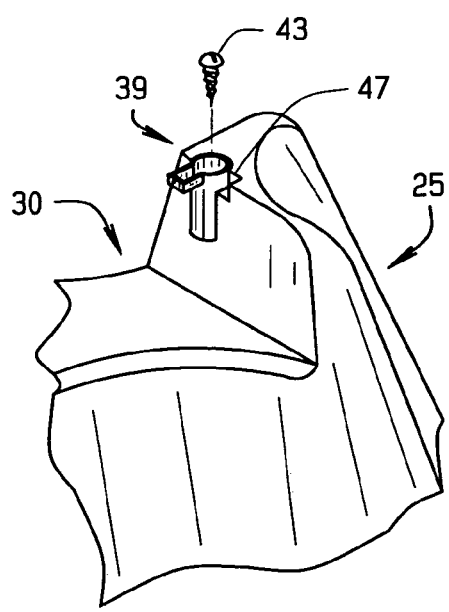
FIG. 16 provides a fractional view of a segment of the bottom of a planter base tray, showing the locking mechanism for attachment of the tray to a deck or porch rail.
Figure 18:
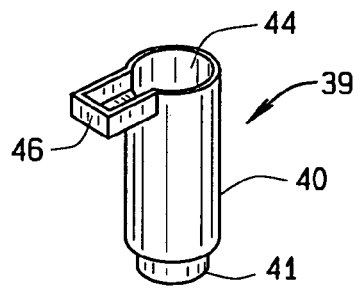
FIG. 18 shows the locking mechanism in an isometric view.
Figure 19:
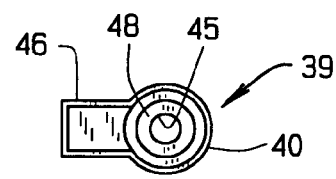
FIG. 19 is a top plan view of the locking mechanism.

FIG. 16 shows a partial view of the bottom of the planter base tray, such as previously disclosed in FIGS. 11 and 12, and in this particular instance, this particular tray is designed for attachment to a rail of wider dimension, such as one formed of a two inch by six inch or related structure. This is the type of rail that may be provided upon the top of a railing, such as upon a porch, deck, patio, or other structure. Essentially, the tray, which is actually the lower planter 25, has the lower spacing 30 provided therethrough, as previously reviewed, and a deck rail, such as the type as just previously described, can snuggly fit therein, when the tray is in the position as shown in FIG. 11, and inserted onto the rail, during its application and usage. At that stage, since the planter may have a center of gravity that may be substantially above the rail, particularly when additional planters may be stacked thereon, it is desirable to provide means for engagement of the lower tray, onto the rail, so as to prevent any tipping or falling therefrom. Hence, a locking mechanism, as at 39, is provided, on both sides of the bottom of the tray, and once fastened in place, can engage the rail, upon its underside, and thereby lock the planter in place, so as to prevent its untimely loosening, such as when a person may brush against it, inadvertently, while participating in some activity upon the deck, or the like. The locking mechanism is more aptly disclosed in FIG. 18, and FIG. 19. As disclosed, it includes a length of sleeve, as at 40, which incorporates a lower base, as at 41, and which is stepped interiorly, simply to provide for its enhanced seating within the slot, as at 42, provided on either side of the tray. A fastening means, such as the screw 43, locates down into the opening 44 of the sleeve, and locates through the opening 45 provided through the bottom of the mechanism, and can be firmly screwed and tightened in place, threading into the base of the slot 42, so as to lock the locking mechanism in place. When in use, the locking mechanism has a lateral tab, as at 46, which is integrally formed with the sleeve 40, and that segment locks under the rail, so as to engage the tray into place.

As can also be noted, there is a clearance slot 47 provided to the side of the slot 42, and it has sufficient dimensions and length so as to allow the tab 46, as when not in use, to be pivoted to the side, when the screw 43 is loosened, and be tightened therein, when the locking mechanism may not be needed.

Figure 17:
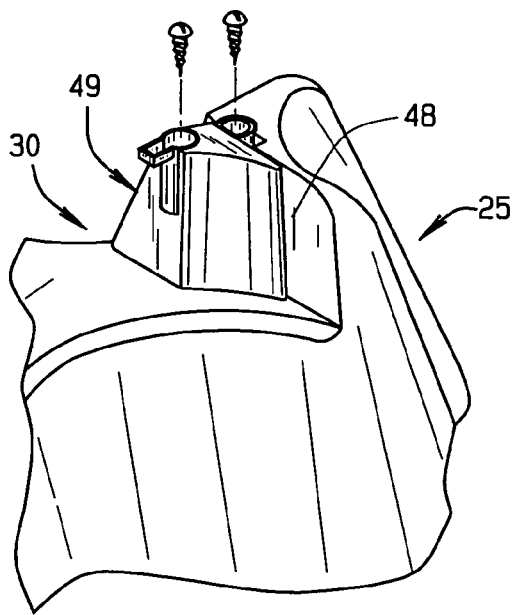
FIG. 17 shows a fractional view of the planter base tray with a spacer means to allow the tray to be locked onto a narrower rail.
Figure 20:
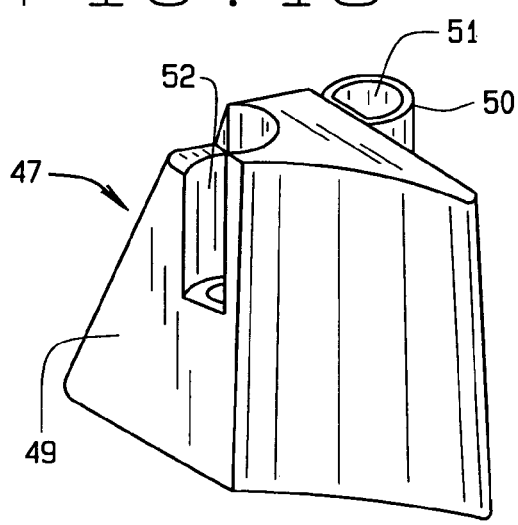
FIG. 20 shows the spacer means of FIG. 17, that engages with the base tray to allow it to attach to a narrower rail.
Figure 21:
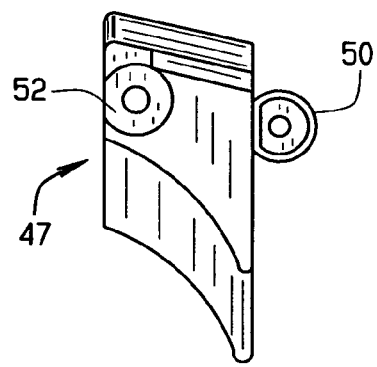
FIG. 21 is a top plan view of FIG. 20.

As an alternative, when the planter base tray 25 is to be mounted onto a railing of smaller dimensions, such as a two inch by four inch board, then it is required that spacer means be provided for accommodating a smaller rail, during the application of the planter assembly to the railing structure. In this instance, a spacer means, as can be seen at 47, in FIG. 20, is applied into the slot 30 that accommodates the insertion of the rail therein, and provides for a narrowing of the space that provides for snug locating of the railing therein, generally in the manner as can be seen in FIG. 17. In this particular instance, the spacer means has various angular shapes, in order to fit accommodatingly within the area of the slot 30 just adjacent to the wall 48 of an extension, as at 29, as previously described with respect to FIG. 12. The spacer means is an amorphous shape, but yet is very accommodatingly located within that space 30, and contiguous with the wall 48, to allow for the extension 29 to provide a narrower dimension between it and the spacer means attaching to the opposite side of the slot 30. Thus, a two by four type of rail will be snuggly located between the surface 49 of the spacer member 47, as shown and a corresponding surface upon the spacer provided at the opposite side of the slot, as can be understood. In this particular instance, each spacer member has an integrally formed sleeve like member 50, similar to the sleeve 40 as previously described, with an opening 51 provided therein, and into which a fastening means, such as one of the screws 43, can locate, and threadedly engage down into the tray 25, in the manner as previously described for the locking mechanism 39. Once the spacer member 47 is engaged, then the planter may be located upon a two inch by four inch rail, or even a rail to any other dimension, as may be required under the circumstances, and a further locking member, equivalent to what has been described in FIG. 18, can locate down into the slot 52 integrally formed therein, and that locking mechanism may be threadedly engaged into the threaded opening 53 provided in the bottom of the slot 52, as can be noted, and as understood. FIG. 21 shows a top plan view of the spacer means 47, with its various sleeve 50, and slot 52, formed therein, which provides for securement of the spacer means to the wall of the extension 25, as previously reviewed.

Hence, with the use of a spacer member of the type as reviewed herein, the tray 25 can be accommodated on the upper rail of any deck railing, and be secured thereto, with the tray having sufficient versatility to accommodate the attachment of a type of spacer means as described herein, to allow the rail to have the tray locked in position thereon, as during usage, and prevent any untimely dislodgement of the entire stackable plant containers and their lower tray, from the same, during usage.

Thus, upon review of the structure of this invention, as described herein, you can be seen that the versatility of its assembly, application, and usage, even though the entire unit may be of significant weight, can hold a variety of planted vegetation, which sustains consistent moisturization of the root systems, and to provide a rather pleasing and attractive display of a floral pattern, for the home, business, and the like. The various adaptable usages of the stacking containers, as described, are intended to provide an illustration as to how its various components can be employed to furnish an overall planting system, that is convenient of assembly, usage, and planting of a multitude of flowers and other plants, after assembly.

Other variations or modifications to the subject matter of this invention may occur to those skilled in the art upon review of the invention as described herein. Such variations, and modifications, if within the spirit of this development, are intended to be encompassed within the scope of any claims to patent protection defined herein. The summary of the invention, its description in the preferred embodiment, and its depiction in the drawings, are set forth for illustrative purpose only.

The invention claimed is:

1. A planter comprising a series of stacked containers, each container having a shape that provides for a series of containers to be stacked in staggered fashion vertically one upon the other to provide a series of stacked containers;

a lower tray provided under the bottom of the stacked containers, and for holding the stacked containers in position, and to allow for collection of any excess residue water as applied to the containers during plant watering;

each container having a series of equally spaced, integral flutes extending outwardly thereof to provide the shaped container, there being internal portions integrally formed of each container and provided intermediate each pair of flutes, each flute of a container thereabove being arranged overlying and in alignment with the internal portion of a shaped container therebelow, when the containers are stacked vertically into their assembly;

each container having a bottom wall, and an elevated base provided within each container and being arranged spacedly upwardly from the bottom wall of the container in which it inserts, said elevated base provided for the support of potting soil thereabove, when a container is prepared for planting, and each elevated base, with the bottom wall of the container, forming a water reservoir therebelow, at least one downwardly depending well integrally formed and extending below the elevated base, and provided for holding potting soil therein, such that when the elevated base is seated within the container, its well locates within the water reservoir for absorption of any moisture therein and attaining moisture migration upwardly into the potting soil of the container to sustain moisturization of any potted plant, each well has a series of slots provided therein to allow for migration of water from the reservoir into the well for moisturizing the potting soil therein;

each flute of a container has an inner wall contour shaped and extending approximately between the upper lip of said container and down to its bottom wall, each elevated base having an extension extending out into the area of the flute, internally of the container, and being arranged in close proximity with the inner wall of said container within the region of its flute to thereby prevent the downward passage of any potting soil into the region of the water reservoir, each elevated base having a series of slots provided therein the allow for passage of excess water into the water reservoir of the container, and each extending portion of the elevated base having at least one of said integral wells extending downwardly therefrom and into which potting soil enters during preparation and usage of the planter, each integral well formed of the elevated base has a bottom, and the bottom of each well extends downwardly into close proximity with the bottom wall of its corresponding container;

the lowest container of the series of vertically stacked containers engages the lower tray upon which it mounts;

a series of said elevated bases, with their downwardly depending wells, are capable of nesting within each other during storage;

the bottom of each container includes its formed water reservoir centrally thereof, a weir integrally provided between said water reservoir and the outer interior segment of each formed flute to provide an outer reservoir thereat, each outer reservoir having at least one slot provided therethrough to allow for drainage of any excess water out of the container and downwardly into any subjacent containers stacked therebelow, the bottom of each container inwardly of their excess water reservoir, and inwardly of its weir, having another integrally and downwardly extending well, and the bottom of each elevated base well extending thereinto, to expose any contained soil within the well to the water provided therein for migration upwardly into the potting soil of the stacked container, whereby upon watering of any plants within the planter allows water to pass into the water reservoir, and to also pass within the region of the flutes and into the outer interior segment of each container outwardly of its weir to provide for passage of excess water into the container therebelow.

2. The planter of claim 1 wherein said tray has a series of castors depending therefrom, and said tray capable of rolling movement when applied.

3. The planter of claim 1 wherein a series of said elevated bases, with their downwardly depending wells, are nestable within each other during storage.

4. The planter of claim 1 wherein the lower container includes a series of castors, extending downwardly therefrom, to provide for facilitating movement of the bottom container, and any containers stacked thereon.

5. The planter of claim 1 and wherein said tray has an upwardly extending locking means, and each lower outer extension of the flute of each container having an inwardly directed slot therein, for engagement with the locking means of a tray, to secure any mounted container within the lower tray thereto and prevent their separation when engaged.

6. The lower container of claim 1 and including a series of slots provided within the elevated base, to provide for descent of water therethrough, but preventing the movement of potting soil through the elevated base during usage.

7. The planter of claim 6 and including wicking means, operatively associated with the elevated base of the container, and said wicking means extending downwardly into the water reservoir, and further extending upwardly into the potting soil, to provide for further transfer of moisture from the water reservoir into the potting soil during usage.

* * * * *